Feb. 19, 1963 H. I. SIDES 3,078,102
CART SUPPORT
Filed Nov. 14, 1960
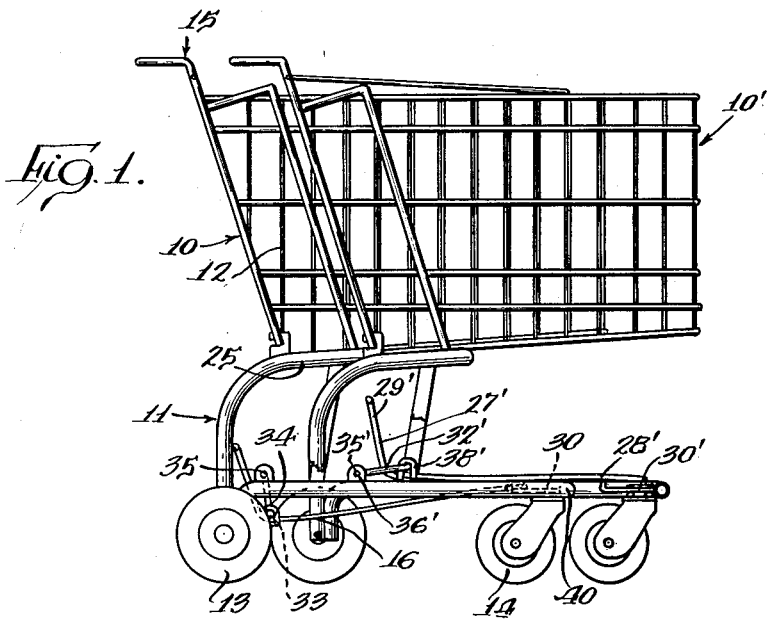
Fig. 1.
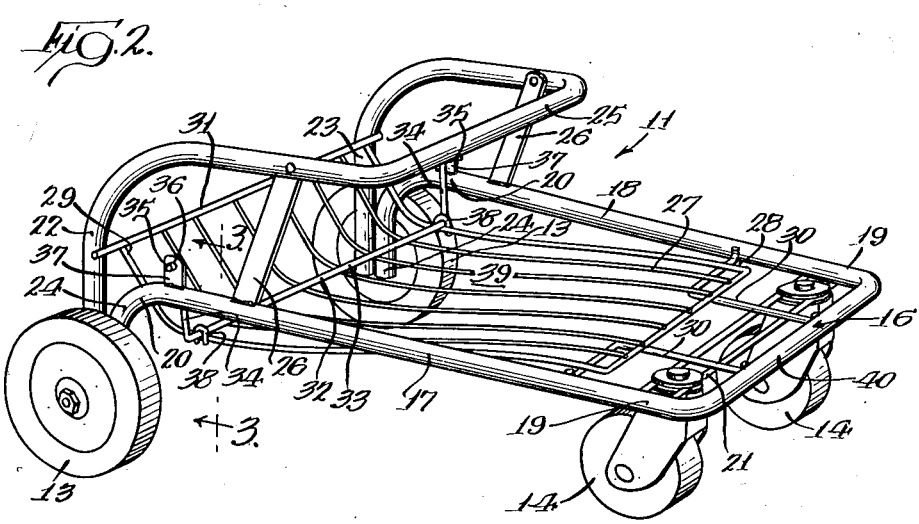
Fig. 2.
Fig. 3.
INVENTOR:
Harold I. Sides
BY
Hofgren, Brady, Wegner, Allen & Stellman
Attys

United States Patent Office 3,078,102
Patented Feb. 19, 1963

3,078,102
CART SUPPORT
Harold I. Sides, Chicago, Ill., assignor to Tote-Cart Co., Chicago, Ill., a corporation of Illinois
Filed Nov. 14, 1960, Ser. No. 69,099
7 Claims. (Cl. 280—33.99)

This invention relates to carts such as grocery carts, and in particular to support structures for use in such carts.

To support relatively bulky items, the conventional grocery cart is provided with a platform disposed subjacent the basket portion of the cart. Where the carts are to be telescoped, as to permit effectively minimized storage space requirements, it is necessary to arrange the platforms so as to permit the movement of the platform of a following cart to at least partially under the forward cart. The present invention is concerned with a new and improved means for movably carrying the platforms in the carts to permit facilitated telescopic association.

Thus, a principal feature of the present invention is the provision of a new and improved cart support structure.

Another feature of the invention is the provision of such a support structure including new and improved means for movably mounting the platform on the base frame of the cart.

A further feature is to provide such a support structure including new and improved means for pivotally connecting the platform to the base frame.

A still further feature of the invention is the provision of such a support structure including a base frame provided with a pair of generally longitudinal, laterally spaced side members having rear and front portions, a pair of upright members adjacent the rear portions, support means disposed between said front portions, a platform having rear and front portions, a pair of connecting elements, means pivotally connecting a lower end of each connecting element to the rear portion of the platform, means pivotally connecting an upper end of each connecting element to the rear portion of the base frame side members, and means on the rear portion of the platform cooperating with the upright members to limit the rearward movement of the platform to maintain the front portion of the platform overlying the support means.

Yet another feature of the invention is the provision of such a support structure wherein the connecting elements comprise the legs of a U-shaped rod extending to substantially below the horizontal plane of the side members and having their distal ends outturned to extend pivotably through apertured lugs upstanding from the base frame side members.

Other features and advantages of the invention will be apparent from the following description, taken in connection with the accompanying drawing wherein:

FIGURE 1 is a side elevation with a portion broken away of a pair of grocery carts in telescoped relationship, each provided with a support structure embodying the invention;

FIGURE 2 is a perspective view of the base structure of the cart; and

FIGURE 3 is a fragmentary vertical section taken substantially along the line 3—3 of FIGURE 2.

In the exemplary embodiment of the invention, as disclosed in the drawing, a grocery cart generally designated 10 is shown to include a base structure generally designated 11 carrying a grocery basket 12 and mounted on suitable wheels 13 and 14. A handle structure generally designated 15 is associated with the base structure and basket for facilitating manipulation of the cart.

As best seen in FIGURE 2, the base structure 11 includes a base frame 16 defined by a pair of generally horizontal, laterally spaced side members 17 and 18, each having a front portion 19 and a rear portion 20. Wheels 14 are carried on the base frame at the front portions 19 by a suitable mounting device 21, and wheels 13 are carried on the base frame at rear portions 20, being rotatably mounted on the lower ends of a pair of upright members 22 and 23 secured, as by welding, to the downturned rear end portions 24 of the side members. Herein, the upright members 22 and 23 define the downturned rear end legs of an upper base frame 25 which carries the basket 12 and handle structure 15 as shown in FIGURE 1. A pair of supporting bars 26 may be provided for supporting the forward end of the base frame 25 on the lower base frame 16.

The support structure 11 further includes a wire platform 27 having a front portion 28 and a rear portion 29. The front portion 28 of the platform slidably rests on supports 30 carried by the front portion 19 of the lower base frame 16. The rear portion 29 of the platform is turned to extend upwardly and is provided at its upper end with a transverse rod 31 slidable along the upright members 22 and 23 to limit the rearward movement of the platform and maintain the front portion 28 in overlying relationship with the support means 30.

The platform 27 is effectively hung on the base frame 16 by means of a U-shaped rod 32 having a bight portion 33 extending transversely across the platform adjacent rear portion 29, and leg portions 34 extending upwardly from the opposite ends of the bight portion 33 to above the horizontal plane of the base frame 16. The distal ends 35 of the rod 32 are outturned and are pivotally received in an aperture 36 provided in each of a pair of lugs 37 secured, as by welding, to upstand from the side members 17 and 18 at the rear portions 20 thereof. The bight 33 of the rod is pivotally connected to the platform 27 by a pair of downwardly opening U-shaped supports 38 secured to the platform, as by welding, to extend upwardly therefrom adjacent the rear portion 29. As best seen in FIGURE 1, the length of each leg portion 34 is sufficient to dispose the bight 33 substantially below the base frame 16 when the platform is allowed to hang freely on the rod 32, whereby the base frame co-operates with the platform to define upwardly opening goods receiving space 39 laterally defined by the side members 17 and 18.

When it is desired to telescope one grocery cart 10 with another similar grocery cart, such as grocery cart 10' illustrated in FIGURE 1, cart 10 is merely moved forwardly into cart 10'. As the front end 40 of the base frame 16 of cart 10 first engages the inclined rear portion 29' of the platform 27' of cart 10', it urges the rear portion 29' upwardly. This causes the platform to swing on the coaxially aligned outturned ends 35' in the lugs 36' thereby moving the platform forwardly and causing the front portion 28' to slide forwardly on the support means 30'. The front portion 28' is prevented from moving upwardly away from the support means 30' by the pivotal connection of the rod 32 to the platform in the U-shaped supports 38' so that the platform may move freely to the position illustrated in FIGURE 1.

When the telescoped carts are disassociated from each other, the weight of the platform causes it to swing downwardly about the axis of the outturned ends 35 and causes the front portion to slide rearwardly on the support means to restore the support structure to the arrangement illustrated in FIGURE 2. The rearward movement of the platform is limited at this time by the sliding engagement of the rod 31 with the upright members 22 and 23 whereby the platform is automatically repositioned as shown.

Thus, the platform 27 provides an improved goods holding means which is readily movable to and from a retracted cart-telescoped position. The means for supporting the platform in the base frame are extremely simple and economical to manufacture and provide effectively maintenance-free long life.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In a grocery cart or the like, a support structure comprising: a base frame including a pair of generally horizontal, laterally spaced side members having rear and front portions; support means disposed between said front portions; a platform having fixedly associated rear and front portions; a pair of connecting elements; means pivotally connecting a lower end of the connecting elements to the platform between said front and rear portions thereof; means pivotally connecting an upper end of the connecting elements to the rear portion of the base frame side members to support the platform with the front portion of the platform maintained in slidable, resting engagement with the support means; and means on the base frame for preventing movement of the front portion of the platform to a position rearwardly of said support means.

2. The support structure of claim 1 wherein the means pivotally connecting the upper ends of the connecting elements to the side members comprises a pair of lugs upstanding from the members to define an axis of pivoting spaced substantially above the longitudinal plane of the side members.

3. The support structure of claim 1 wherein the connecting elements extend to substantially below the longitudinal plane of the side members in normally supporting the platform.

4. In a grocery cart or the like, a support structure comprising: a base frame including a pair of generally horizontal, laterally spaced side members having rear and front portions; support means disposed between said front portions; a platform having fixedly associated rear and front portions; a U-shaped rod; means on the rear portion of each side member pivotally connecting the distal ends of the rod to the side members for swinging the bight portion of the rod about an axis extending transversely between said side members; and means between said front and rear portions of the platform pivotally connecting the bight portion of the rod thereto whereby the platform may swing about said axis and pivot about the axis of the bight portion of the rod to support the platform with the front portion of the platform in maintained slidable, resting engagement with the support means.

5. The support structure of claim 4 wherein the means pivotally connecting the rod to the side members comprises a pair of lugs having coaxial apertures, and the rod includes outturned distal ends pivotally received in the apertures.

6. In a grocery cart or the like, a support structure comprising: a base frame including a pair of generally horizontal, laterally spaced side members having rear and front portions; a pair of upright members adjacent the rear portions; support means disposed between said front portions; a platform having fixedly associated rear and front portions; a pair of connecting elements; means pivotally connecting a lower end of the connecting elements to the platform between said front and rear portions thereof; means pivotally connecting an upper end of the connecting elements to the rear portion of the base frame side members; and means on the rear portion of the platform cooperating with the upright members to limit the rearward movement of the platform to maintain the front portion of the platform in slidable, resting engagement with the support means.

7. In a grocery cart or the like, a support structure comprising: a base frame including a pair of generally horizontal, laterally spaced side members having rear and front portions; a pair of upright members adjacent the rear portions; support means disposed between said front portions; a platform having rear and front portions; a U-shaped rod having outturned distal ends; a lug having an aperture on the rear portion of each side member, said apertures being aligned on an axis extending transversely between said side members for pivotally receiving the distal ends of the rod to swing the bight portion of the rod about said axis; means on the rear portion of the platform pivotally connecting the bight portion of the rod thereto whereby the platform may swing about said aperture axis and pivot about the axis of the bight portion of the rod to support the platform with the front portion of the platform overlying the support means; and means on the rear portion of the platform cooperating with the upright members to limit the rearward movement of the platform to maintain the front portion of the platform overlying the support means.

References Cited in the file of this patent

UNITED STATES PATENTS

| | | |
|---|---|---|
| 2,785,906 | Matter | Mar. 19, 1957 |
| 2,798,730 | Smith | July 9, 1957 |
| 2,871,024 | Young | Jan. 27, 1959 |
| 2,882,062 | Hoedinghaus et al. | Apr. 14, 1959 |
| 2,903,269 | Hennion | Sept. 8, 1959 |